United States Patent [19]

Beach et al.

[11] Patent Number: 5,058,110

[45] Date of Patent: Oct. 15, 1991

[54] PROTOCOL PROCESSOR

[75] Inventors: Robert Beach, Los Altos; Mark Bryers, San Jose; Casey Cox; Richard Fall, both of Palo Alto; Norman Finn; Douglas Laird, both of San Jose, all of Calif.

[73] Assignee: Ultra Network Technologies, San Jose, Calif.

[21] Appl. No.: 346,648

[22] Filed: May 3, 1989

[51] Int. Cl.$^5$ .............................. H04J 3/02; H04J 3/24
[52] U.S. Cl. .................................. 370/85.6; 370/85.1; 370/94.1; 371/37.7; 371/37.6; 371/53
[58] Field of Search .................... 370/94.1, 94.2, 94.3, 370/85.1, 85.6, 85.11, 85.9, 85.13; 371/37.6, 53, 30, 48, 37.7

[56] References Cited

U.S. PATENT DOCUMENTS 4,907,225  3/1990  Gulick et al. ...................... 370/94.1
4,912,701  3/1990  Nicholas ............................ 370/94.1

Primary Examiner—Douglas W. Olms
Assistant Examiner—Wellington Chin
Attorney, Agent, or Firm—Blakely, Sokoloff, Taylor & Zafman

[57] ABSTRACT

A computer network method and apparatus. The present invention comprises a computer network having one or more hubs, each hub comprising one or more connection means for connection of computing devices to the network. Each connection means comprising a first interface means for coupling with a computing device, a second interface means for coupling with the network and a protocol processing means. The protocol processing means receives message packets and, depending on the message type, processing the message as either a network control message or a data transfer message. The present invention provides for "flow through" of data in the case of data transfer messages. The present invention further provides for calculation of checksum bytes as a data packet is received by the protocol processing means.

45 Claims, 13 Drawing Sheets

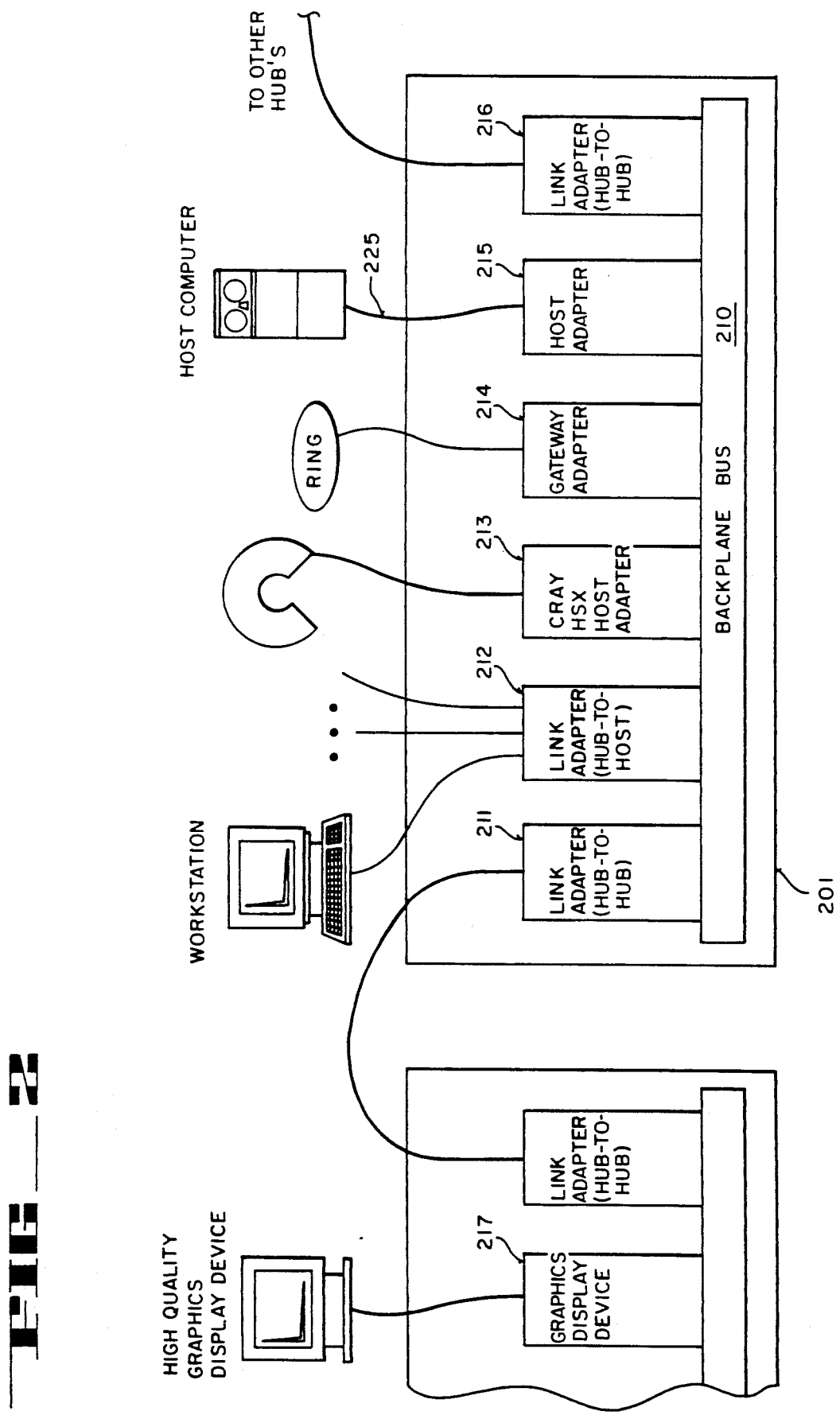

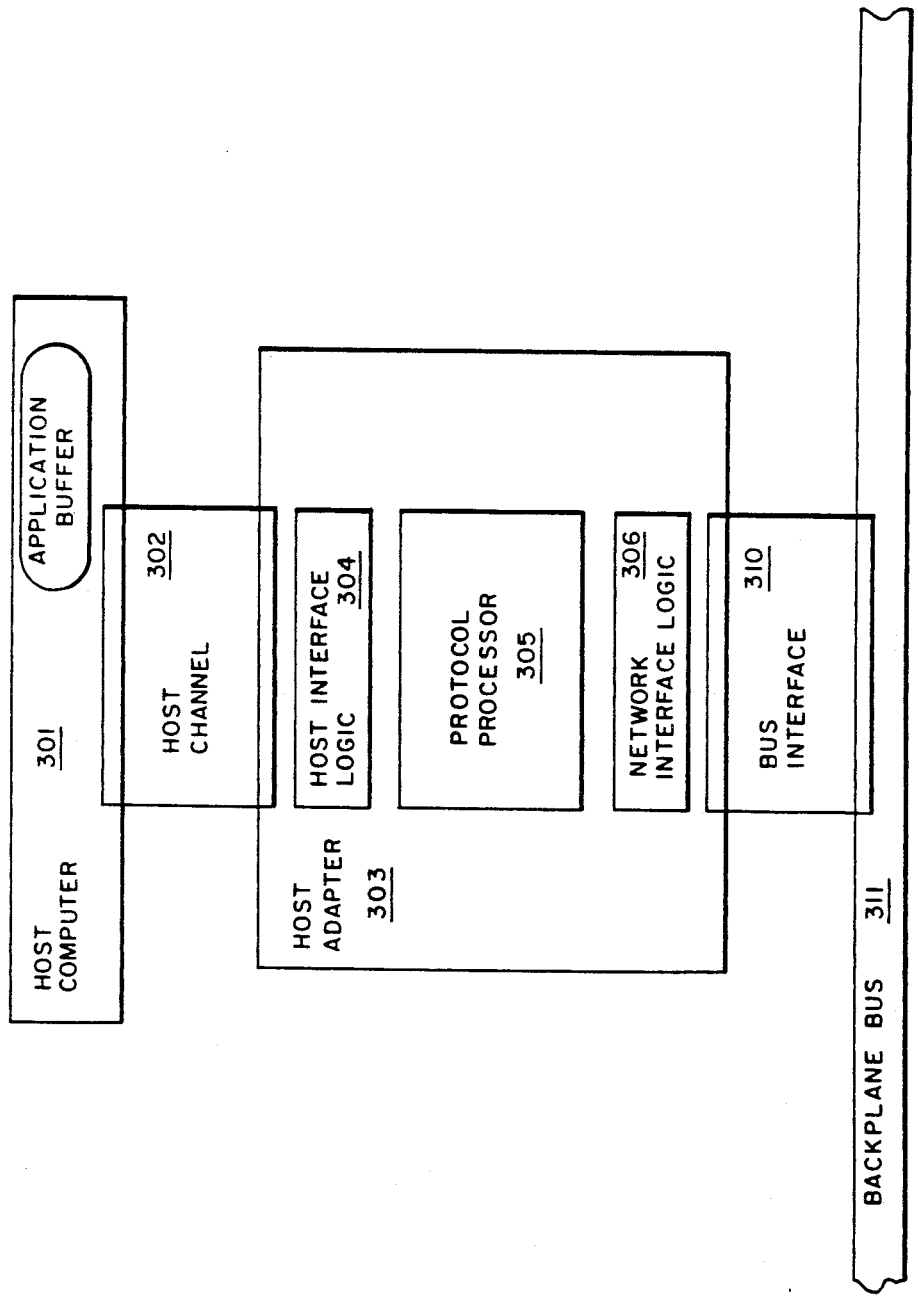

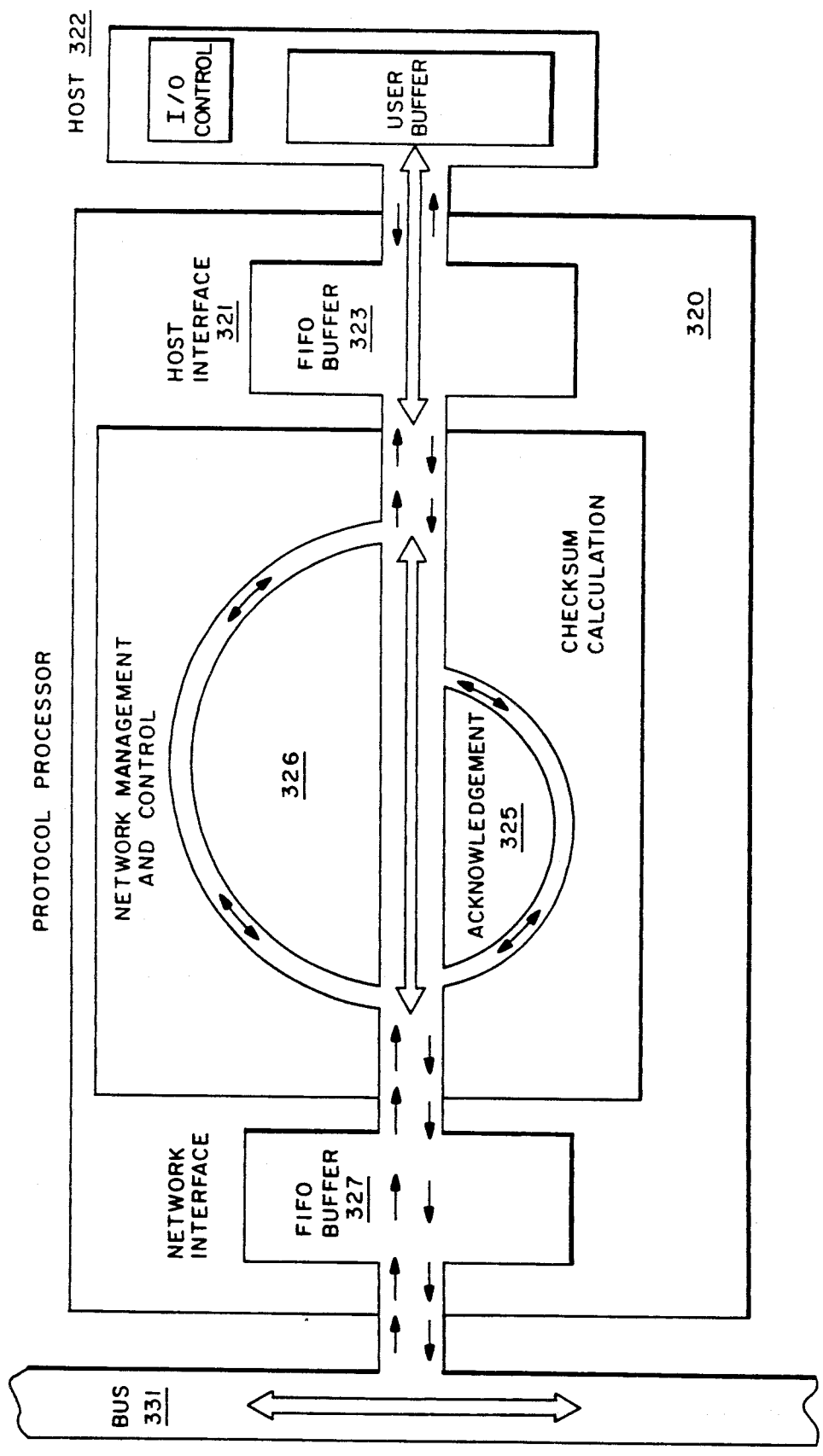
FIG_3B

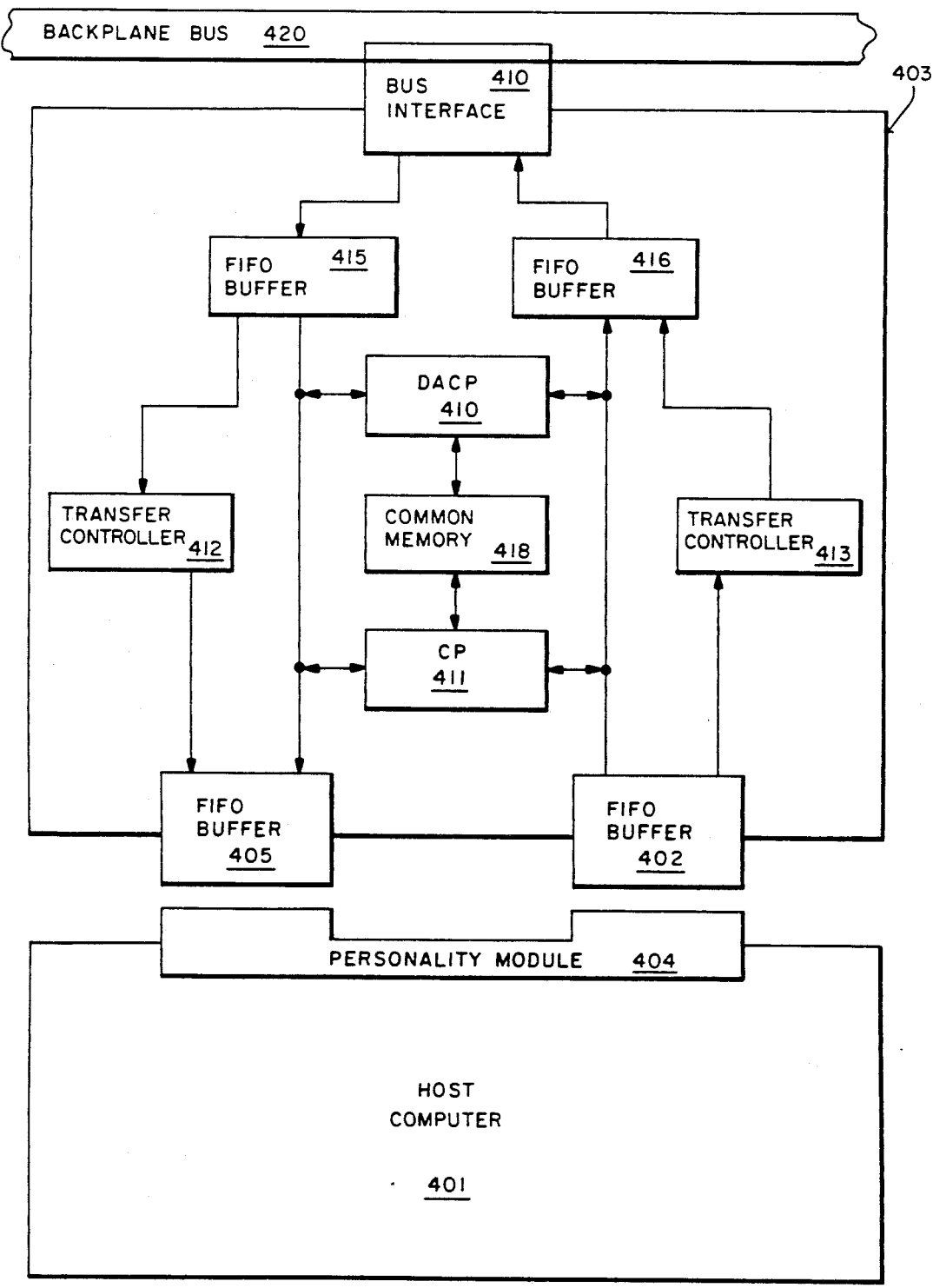

| 601 | 602 | 603 | 604 C I U S | 605 | 607 C I | 608 L I U S | 609 L O U S | 610 | 611 | 612 |
|---|---|---|---|---|---|---|---|---|---|---|
| PM | Unit | Reserved | | Reserved | | | | STAT SEL | CMD SEL | Command |
| 63 | 62 61 | 58 57 | 54 53 | 52 | 51 50 | 49 | 48 | 47 40 | 39 32 | 31 0 |

Fig. 6(a)

| 620 | 621 | 622 | 623 | 624 | 625 | 626 | 627 |
|---|---|---|---|---|---|---|---|
| PM | Unit | Reserved | Expansion | S I | STAT SEL | Reserved | Status |
| 63 62 | 61 58 | 57 52 | 51 49 | 48 | 47 40 | 39 32 | 31 0 |

Fig. 6(b)

PROTOCOL PROCESSOR

BACKGROUND OF THE INVENTION

1. Field of the invention

The present invention relates to the field of computer networks and, more specifically, to the field of protocol processing systems for computer networks.

2. Prior Art

A number of computer networks are well known in the art. In general, these networks can be placed in one of three categories: (1) bus configurations, (2) ring configurations and (3) hub configurations.

One well-known bus configuration is the Ethernet system, originally developed by the Xerox Palo Alto Research Center. The Ethernet system uses a passive environment, such as a coaxial cable for communication between nodes on the network. The Ethernet system has no need for a central controller as it utilizes a fully distributed link mechanism known as Carrier Sense Multiple Access with Collision Detection (CSMA/CD). A station or node which is connected to the Ethernet network wishing to transmit information will first listen on the cable to see if the channel is free. If the station finds the channel in use, or if a collision with another channel is detected, the requesting channel waits a predetermined period of time and then retries the transmission. More detailed specifications of Ethernet configurations may be found with reference to *The Ethernet—A Local Area Network, Data Link Layer and Physical Layer Specifications, Version 1*, ACM *Computer Commun.* Rev., Vol. 11, no. 3, July 1981, pp. 20–66.

A ring configuration differs, physically, from a bus configuration in having the ends of its communication cable connected together to form a ring, rather than being open-ended as in a bus configuration. A node on the ring is connected to allow it to transmit bits of information onto the ring. Generally, a token is sent onto the ring. Nodes in the network monitor the ring for a token. When the token arrives at a node which wishes to transmit information, the node takes the token off the ring and transmits the information, along with address and error checking data, onto the ring. The other nodes continue to monitor the ring for the token. Nodes are also monitoring the ring for their own address. Each node propagates the information on the ring to the next node, waiting for the token or its address to appear. When a node recognizes its own address on the ring, it processes the information. The transmitting node replaces the token on the ring when it has completed transmission of information.

Generally, such bus and ring configurations are utilized in local area networks (LANs) A third type of network utilizes a hub architecture in which a plurality of devices, such as computers, graphics displays, etc. are coupled to a central hub. The hub allows communication of information between the plurality of devices. Further, the hub may be connected with one or more other hubs allowing communication of information between devices connected with the first hub and devices connected with other hubs.

In a hub configuration, as an example, it is known to accept a packet of information into a memory of a communication processor. The communication processor then processes the packet, adding necessary header and control information and transmits the packet in the network. In such a system, packets must first be fully received by the communication processor, then processed and finally placed on the network.

As the speed of computer systems and the demand for data increases, the quantity and speed of delivery of data in such networks must also increase. Therefore, as one primary object of the present invention, it is desired to develop a computer networking system which allows for delivery of data in the network at speeds heretofore not possible.

Generally, known networking systems require data which is to be transmitted over the network to be organized in a packet having a specified format. For example, a packet may typically consist of header information and, optionally, data. The header comprises information identifying the type of packet (e.g., data or control) and address information (e.g., destination node). For example, a particular packet may be a control packet used for establishing a connection on the network or it may be a data packet comprising data to be transmitted over the network. Processing requirements for different packet types vary. Therefore, it is a further object of the present invention to develop a networking system which efficiently processes packets of varying types.

Networking systems generally must provide for error detection and, optionally, corrections when transmitting information. Such detection/correction schemes are useful in determining whether a bit or number of bits have changed states during transmission, optionally, correcting such bits to their original state, and determining whether all bytes have been correctly transmitted. A number of error correction/detection schemes are well known in the art.

Known networking systems provide for calculation of a checksum for each packet of data processed by the system. The checksum is typically computed and transmitted as part of the data packet; normally, the checksum field is located in data packet as part of a header. The actual checksum value is calculated based on the header and user data.

Such known systems typically require two passes when processing a data packet. First, the data packet may be stored in a memory and a first pass through the data is required to identify the packet as a particular request type. Control information may then be added to the packet. A second pass is then made through the data to calculate a checksum.

Therefore, as another object of the present invention it is desired to develop a networking system which efficiently provides for error detection and checksum calculation.

These and other objects of the present invention will be described in more detail with reference to the Detailed Description of the Present Invention and the accompanying drawings.

SUMMARY OF THE INVENTION

An apparatus and method for allowing communication between a plurality of computing devices in a network is described. The network of the present invention comprises one or more hubs which may be networked together for allowing communication between a plurality of computing devices, such as supercomputers, graphics terminals, workstations, token ring networks, host computers and the like.

Each hub in the network comprises a plurality of adapters for allowing connection with one or more computing devices and a means for providing communication between the adapters, such as a backplane bus.

The adapters of the present invention each comprise a host interface, a network bus interface and a protocol processor. The protocol processor accepts information, either from the network or from a computing device coupled with it, through the network bus interface and host interface respectively. When the protocol processor receives a packet of information, it identifies the packet as either a time-critical network request, such as for the transfer of information from one computing device to another, or as a non-time-critical request, such as a network control request.

Time critical requests are logically processed by a first means optimized for processing such requests. The first means allows for "flow-through" of data packets from the computing device. Non-time-critical request are logically processed by a second means for handling network control functions.

In one embodiment of the present invention, the time-critical requests and non-time-critical requests are handled by separate physical processors. In a second embodiment, a single physical processor handles both logical functions.

The present invention further discloses use of FIFO buffers to facilitate flow-through of information and a unique checksum calculation to allow checksums to be computed as each byte of a data packet is received by the adapter card.

The present invention further disclosing processing packets of information by the adapter as each byte of information arrives at the adapter. Such a system leads to processing efficiencies and allows for flow-through of information.

BRIEF DESCRIPTION OF THE DRAWINGS

FIG. 2 is a block diagram illustrating two hubs of the present invention.

FIG. 3(a) is a block diagram illustrating an adapter of the present invention.

FIG. 3(b) is a block diagram illustrating logical data flows through an adapter of the present invention.

FIG. 4 is a block diagram further illustrating an adapter of the present invention.

FIG. 6(a) is a diagram illustrating an input port status word of the present invention.

FIG. 6(b) is a diagram illustrating an output port status word of the present invention.

DETAILED DESCRIPTION OF THE PRESENT INVENTION

A method and apparatus for networking computer systems and terminals is described. In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

OVERVIEW OF A TYPICAL NETWORK

The present invention describes a system for networking (allowing communication of information) in computer systems and the like. For example, a supercomputer, such as a Cray supercomputer, may be networked with a graphics display device. Alternatively, a number of supercomputers may be networked together, or supercomputers may be networked with workstations, graphics display devices, mainframe computers, etc. It will be obvious to one of ordinary skill in the art that the present invention may be utilized to connect any number of combinations of computer systems and terminals in a network.

The presently preferred embodiment is embodied in the Ultra Network System available from Ultra Network Technologies of San Jose, Calif.

As the speed of computer systems and the demand for data increases, the requirements for networking systems grows. Further, faster networking systems are required. For example, current technology graphics display devices have very high resolution. This high resolution requires presentation of a large number of bits of information to the display device and these bits of information must be presented at a high rate of speed.

One method of increasing the speed of a computer network is to increase the bandwidth of links between devices in a network. For example, fiber optics links between devices, using current technology, allow bandwidths of one gigabit per second or more. However, the present invention recognizes that many known networks fail to effectively deliver data over more than a relatively small percentage of the available bandwidth. Typically, this may be due to overhead costs of processing network protocols as well as bottlenecks encountered in the communications path.

Therefore, the present invention discloses a protocol processor which, as will be seen, is optimized for processing network protocols. Thus, the overhead of processing protocols is removed from the computer devices coupled to the network. This configuration allows the advantage of off-loading processing from the computer devices, allowing these devices to increase processing cycles devoted to user applications. Further, the present invention discloses apparatus and methods which allow greater utilization of available communication bandwidth.

Figure 1:
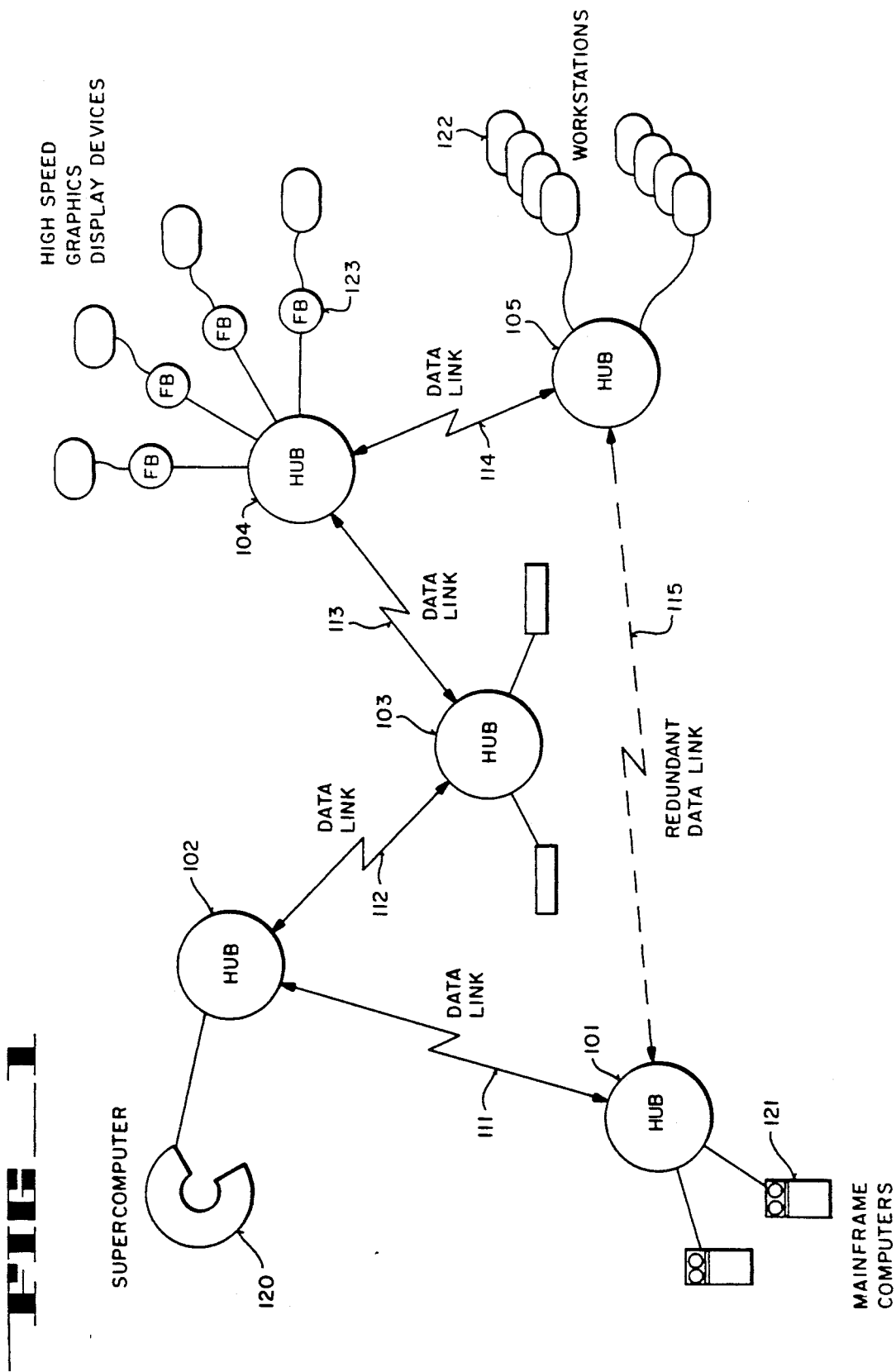
FIG. 1 is an overall block diagram of a network as may utilize the present invention.

FIG. 1 illustrates a typical configuration of a computer network as may be implemented by the present invention. The present invention preferably uses a hub network in which a plurality of hubs 101-105 may be connected by high speed data links 111-114. In the preferred embodiment, the data links 111-114 may comprise coaxial cabling, fiber optic cabling or the like. In the current technology, coaxial cable links provide for distances between hubs of approximately 350 feet. Fiber optic links provide for distances of up to 2 kilometers. It will be obvious that repeating and amplifying circuitry may be employed to increase the above-mentioned distances. The present invention further provides for redundant data links, such as data link 115, for insuring the reliability of the system.

Each hub 101–105 may have a plurality of computer devices-such as supercomputers 120, mainframe computers 121, workstations 122 and high speed graphics display devices 123—coupled with it. Although the illustration of FIG. 1 shows a particular configuration of computer devices coupled with each hub, it will be obvious to one of ordinary skill in the art that any number of combinations of devices may be coupled with a particular hub without departure from the spirit and scope of the present invention.

The present invention utilizes a conventional layering model for definition of the network of the preferred embodiment. A transport layer provides connection and connectionless services via the ISO 8073 and 8602 specifications. A network layer provides connectionless oriented services based on the ISO 8473 specification. Data link and physical layers follow the IEEE 802 model.

OVERVIEW OF A HUB

FIG. 2 illustrates a hub 201 of the present invention in more detail. Each hub 201 comprises a backplane bus 210 which has a plurality of slots for coupling cards or "adapters", such as adapters 211–216. In one embodiment of the present invention, the backplane bus 210 comprises 14 slots for coupling adapters. In a second embodiment, the backplane bus 210 comprises 4 slots for coupling adapters. Adapters coupled with each slot may perform a variety of functions such as hub-to-hub communications, hub-to-host communications, and interface with other network communication systems such as a FDDI or Ethernet network. In general, the preferred embodiment allows four types of adapters: (1) host adapters, (2) link adapters, (3) graphics display device adapters and (4) gateway adapters.

Host Adapters

A host adapter, such as adapter 215 provides for communication between the hub and host computers. The preferred embodiment generally interfaces a host adapter with the highest performance channel available on the host computer. Effective bandwidths of between 10 and 100 Mbytes are available using host adapters of the currently preferred embodiment.

Each host adapter comprises a protocol processor which allows for offloading, from the host computer, protocol processing work required for network communication. Each host adapter further comprises a bus interface for interfacing the backplane bus and host interface for interfacing with the host. The protocol processor, bus interface and host interface will be described in more detail below.

The host adapters of the preferred embodiment may be either host resident (i.e., contained within the host computer itself) or hub resident (i.e., contained in the hub, as illustrated by FIG. 2).

Host computers having extendable channels use hub resident adapters coupled with the host computer via a channel cable, such as cable 225. An example of a hub resident, channel based connection is an adapter provided by the preferred embodiment for coupling with a Cray XMP host computer, such as adapter 213. This adapter preferably connects with the 100 Mbyte/second HSX channel of a Cray XMP computer.

Host computers having a bus interface, rather than a channel interface, are coupled with the hub via a host resident adapter. Host resident adapters are identical in function to hub resident adapter, except the host is coupled with the hub though a link adapter rather than a host channel cable. For example, the present invention provides a host resident VME adapter which provides for 25 Mbyte/second interface to any of several high performance workstations. Such an adapter is illustrated as adapter 212 of FIG. 2.

Link Adapters

Link adapters provide for communications between hubs (hub-to-hub) and communication between a hub and hosts or other devices (hub-to-host). Link adapters support a variety of speeds and distance requirements. Each link adapter comprises a bus interface, protocol processor and at least one link interface. The bus interface, protocol processor and link interface are described in more detail below.

A hub may have more than one link adapter installed for hub-to-hub communication. Additional adapters provide for redundant data paths as well as additional connectivity and bandwidth.

As mentioned previously, link adapters further provide for coupling of a hub with host resident host adapters. In the preferred embodiment, a single link adapter may be coupled with one or more hosts.

Graphics Display Devices

A hub may further comprise graphics display devices, such as graphics display device 217. The graphics display device comprises a frame buffer for driving a high resolution direct raster graphics display.

Gateway Adapters

Finally, a hub may be interconnected with other networks, such as the ANSI X3T9.5 defined FDDI token ring gateway or an ethernet system. A gateway adapter, such as adapter 214, is used as a "gateway" from the hub to the external network.

OVERVIEW OF AN ADAPTER

Adapters, such as the host adapters 213 and 214 and link adapters 211, 212 and 216, may be described generally as comprising a protocol processing means which processes network protocols and performs other system overhead functions, a bus interface means for interfacing with the backplane bus of a hub of the present invention and a port interface means for interfacing with one or more computing devices.

Physical Overview of an Adapter

FIG. 3(a) is a block diagram illustrating a hub resident host adapter of the present invention. This adapter is representative of the technology of host and link adapters of the present invention.

As shown in FIG. 3(a), a host computer 301 is electrically coupled with host adapter 303 through a host channel 302. Host interface logic 304 resides on the host adapter card 303 for providing interface logic with the host computer 301. The host interface logic provides communication between a protocol processor 305 and a "personality module" for the host system. The personality module is a module designed for the particular host system; that is, a custom personality module is designed for each host computer system. The personality module provides a standard interface to the protocol processor while allowing a customized interface for the particular host computer system. The personality module comprises logic which may be implemented in hardware or software.

The protocol processor 305 is further coupled with a backplane bus 311 (shown as backplane bus 210 of FIG. 2) through network interface logic 306 and bus interface 310. In the preferred embodiment, network interface logic 306 and host interface logic 304 comprise the same circuitry.

A host computer 301, or the like, may thus communicate with other computers or devices coupled with the hub over the backplane bus 311 and may communicate with devices coupled with other hubs linked to the present hub.

Logical Overview of an Adapter

FIG. 3(b) logically illustrates the data flow through an adapter of the present invention. Data may be received from a host system 322 by an adapter 320 at a host interface 321. As will be described in more detail below, data is received from the host system 322 into a FIFO buffer 323. Use of a FIFO buffers provides for processing efficiencies and increased throughput.

FIG. 3(b) illustrates the logical data flow through an adapter of the present invention. As such, although the preferred embodiment of the present invention utilizes the logical data flow of FIG. 3(b), certain implementation differences are present. Specifically, the FIFO buffer 323 is illustrated as separate from the host interface 321. In the preferred embodiment, the FIFO buffer 323 is an integral part of the host interface 321. The FIFO buffer 27 is illustrated as separate from the network bus interface. In the preferred embodiment, the FIFO buffer 327 is an integral part of the network bus interface.

As data arrives, header information is examined to determine if the request is for a network management function, such as requesting a communication with another host (non-time-critical functions) or if it is for transfer of data in the network (time-critical function). Logically, these two types of functions are handled by separate processing means, 325 and 326, in the present invention. Recognizing the differences in processing requirements for these functions and allowing processing to be logically divided leads to increased throughput in the present invention.

A second FIFO buffer 327 is provided for allowing information to be received from the network over the network bus 331 and to allow information to be placed onto the bus 331.

Checksums are calculated for each block (data frame) to be transferred on the bus as each byte of data arrives at the adapter 320. This further leads to increased processing efficiencies over known prior art methods of calculating data frame checksums. The checksum information is transmitted at the end of the data frame, allowing transmission of the data frame to its destination to begin prior to receiving the end of the data frame at the adapter 320.

Each of these aspects of the present invention will be discussed in more detail below.

PROTOCOL PROCESSOR/PERSONALITY MODULE INTERFACE

The protocol processor/personality module interface of the present invention will be described in more detail with reference to FIGS. 4, 5(a), 5(b), 6(a) and 6(b). Two way communication is provided between personality modules and a protocol processor.

An input interface, shown as FIFO buffer 402, provides an interface to the personality module 404, allowing for the host computer 401 (corresponding to host computer 301 of FIG. 3) to communicate with the protocol processor 403. The input interface provides data, as well as status information and configuration information, from the personality module. Generally, configuration information is provided at power-up or during a reset of the personality module.

An output interface, shown as FIFO buffer 405, provides for communication from the protocol processor 403 to the host computer 401 through the personality module 404.

The input and output interface are described in more detail with reference to FIGS. 5(a), 5(b), 6(a) and 6(b).

Figure 5A:
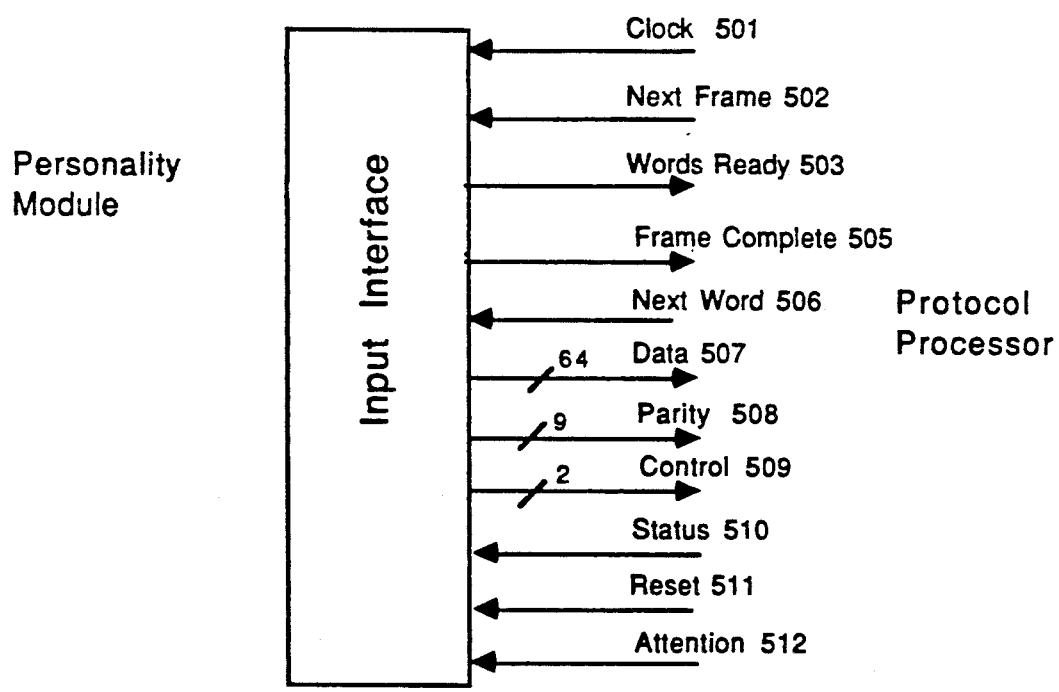
FIG. 5(a) is a diagram illustrating an input interface of the present invention.

Input Interface to the Protocol Processor—FIG. 5(a)

The input interface provides for communication of plurality of signals between the personality module and the protocol processor. These signals are described in more detail with reference to FIG. 5(a) and Table I.

TABLE I

| Signal Name | Undriven State | Direction | Meaning |
| --- | --- | --- | --- |
| In_clock | | PP to PM | Continuously running period ≧ 50 ns |
| Next_frame | false | PP to PM | Frame marker accepted; advance FIFO |
| Words_ready | false | PM to PP | Data is being present on the port |
| Complete | false | PM to PP | Frame marker is being presented |
| Next_word | false | PP to PM | Data accepted; advance FIFO |
| Data | 1 | PM to PP | 64-bit data word |
| Parity | 1 | PM to PP | 9 odd parity bits on data and control bits |
| Control | 1 | PM to PP | Control signals |
| Status | false | PP to PM | Allows communication from input port to PM status register(s) |
| Reset | true | PP to PM | System reset |
| Attention | false | PM to PP | Serious error detected by the PM |

The protocol processor provides a clock signal 501 for synchronization of the next frame 502, next word 506 and reset 511 signals. The clock signal 501 is further used for control of state machines in the personality module. The personality module samples the next frame 502, next word 506 and reset 511 control signals on the rising edge of the clock signal 501. The personality module provides status information on the word ready 503 and frame complete 505 signal lines within a specified time after the rising edge of the clock signal 501. In the preferred embodiment these signals are typically provided within 30 nanoseconds. (Signals are provided at one-half of the clock rate; the clock rate of the preferred embodiment is 61.5 nanoseconds.) The data 507, parity 508 and control 509 lines will also be driven within the specified time.

The next frame signal 502 is asserted by the protocol processor to request the next available frame of data.

The word ready signal 503 is asserted by the personality module to indicate that the data 507, parity 508 and control 509 lines have valid data. In the preferred embodiment, the word ready signal 503 is not asserted by the personality module until there are at least four 64-bit data words available in a buffer for transfer to the protocol processor. If a particular data frame contains less than four 64-bit data words, word ready signal 503 will be asserted when the complete frame is available in the buffer. After the personality module asserts the word ready signal 503, a word of data may be read by the protocol processor and the next word signal 506 may be asserted by the protocol processor to allow the personality module to prepare the next data word for transfer. If another data word is not available, word ready signal 503 will not be asserted in response to next word signal 506.

The frame complete signal 505 indicates that a word now being output on the data lines is the final word in the currently selected buffer (i.e., it is the end of the data frame). The frame complete signal 505 remains asserted until the next buffer is selected. Any assertions of the next word signal 506 after the frame complete signal 505 is asserted will be ignored until next frame signal 502 is asserted.

The next word signal 506 causes the currently selected buffer to advance its pointers to the next 64-bit data word. When asserted, each rising edge of clock 501 will cause the buffer to advance its pointers to the next available word and to drive this word onto the data lines 507, parity lines 508 and control lines 509. It also causes the word ready signal 503 and frame compete signal 505 to be asserted or deasserted to reflect the new state of the buffer. Once selected, the data lines 507, parity lines 508 and control lines 509 will remain stable until the next rising edge of the clock 501 in which next word 506 is asserted. If next word signal 506 is asserted continuously, a new word will be output, the buffer pointers advanced and status signals updated on the rising edge of each clock signal 501. Next word signal 506 is only asserted when word ready signal 503 has been asserted indicating there is a word available for reading. In addition, in the preferred embodiment, to read the first data word from the buffer, the next word signal 506 does not need to be asserted. The first data word is provided responsive to the next frame signal 502 being asserted.

In the currently preferred embodiment, 64 bits of data are provided on data lines 507. Nine bits of parity information are provided on parity lines 508 (one parity bit per 8-bit byte). The preferred embodiment utilizes an odd parity scheme for data bits.

The preferred embodiment further allows for two bits of control information on control lines 509. In the preferred embodiment, one of the control bits (termed C0) is used to signal that a data word being transmitted is invalid. Invalid data words may be detected in the preferred embodiment and presented to the next stage in order to provide for increased data transmission speed. In the present invention, the invalid data is detected at an earlier stage due to a parity error. The invalid data may be passed on to later stages with the parity bit corrected and the C0 signal asserted until the invalid data reaches a stage in which it may be processed.

The meaning of the second control bit (termed C1) is dependent on the particular personality module.

A status signal may be asserted by the protocol processor on status line 510. The status signal allows certain signal lines to be used for dual functions. In a first mode, the status signal is not asserted and the system operates in a normal data transfer mode, as described above. In a second mode, the status signal is asserted by the protocol processor. In this second mode, the personality module asserts status information on data lines 507 responsive to the status signal being asserted. The next word line 506 is utilized in the fashion described above to unload status words from the personality module and during the time the status signal 510 is asserted, all next word signals 506 are ignored by the personality modules buffers. The word ready signal 503 is used to indicate a status word is available and the frame complete signal 505 is used to indicate the end of the status information. The control lines 509 are used to indicate error conditions such the attempted unloading of non-existent status words. The number and type of status words is dependent on the particular personality module. Assertion of the reset signal 511 by the protocol processor causes the personality module to clear and reset all buffers, reset internal states and prepare for delivering appropriate personality module characteristics to the protocol processor.

Finally, each personality module may assert an attention signal 512. The attention signal 512 is an asynchronous error signal which may be generated by the personality module to signal the protocol processor that an error has occurred. An example of errors which cause the attention signal to be asserted are parity errors detected by the personality module while reading data from output port. After asserting an attention signal, the personality module must be reset.

As discussed above, multiple personality modules may be coupled with a protocol processor. In order to allow personality modules which are not currently selected by the protocol processor to generate an attention signal, the attention signals of all personality modules coupled with a protocol processor are OR'ed together. Whenever an attention signal is received by a protocol processor, the protocol processor polls status bits of all personality modules coupled with it to determine which personality module is generating the attention signal.

Status Word—FIG. 6(a)

Every personality module of the preferred embodiment has at least eight status words numbered 0-7 which may be communicated to the protocol processor when status signal 510 of FIG. 5(a) is asserted. The information returned by status words 0 through 7 is shown with reference to Table II, below. The information is returned in the low-order eight bits (bits 0-7) of the status field of the status word (described below).

TABLE II

| Status Word Selected | Status |
| --- | --- |
| 0 | Model Number (high order bits) |
| 1 | Model Number (low order bits) |
| 2 | Hardware version |
| 3 | Hardware/firmware version |
| 4 | Hardware options |
| 5 | Serial Number (high order bits) |
| 6 | Serial Number (middle order bits) |
| 7 | Serial Number (low order bits) |

Status words 0 and 1 contain a status code representing the model number of the particular personality module. Status word 2 contains information configuration information; status word 3 contains a revision level for the particular personality module board; status word 4 is currently reserved and status words 5-7 contain a 24-bit serial number for the personality module. In addition to the above-described eight status words, any particular personality module may have additional status words which may be associated with the personality module as a whole or with individual sub-units coupled with the personality module. The format of the status word is described in more detail with reference to FIG. 6(a).

The personality module returns a 64-bit status word in response to the status line 510 of FIG. 5 being asserted. The personality module returns its address (personality module address "PM") in field 620 (bits 62 and 63). If a particular sub-unit coupled with the personality module is responding, the sub-units address is returned in field 621 (bits 58-61). In the preferred embodiment, bits 52-57 (reserved field 622), bits 49-51 (expansion field 623) and bits 32-39 (reserved field 626) are reserved for future development. Bit 48 is a status invalid (SI) field 624 which is driven to a 0 by the personality module to indicate to the protocol processor that there is valid status information on the input port. In the preferred embodiment, undriven lines default to 1. The status selected (STATSEL) field 625 (bits 40-47) indicates the particular status word (e.g. status word 0 through 7) being returned. Finally, the status field 627 (bits 0-31) contains status information. The format of status words 0 through 7 is described with reference to Table II. Other status words may have predetermined personality module specific formats.

Figure 5B:
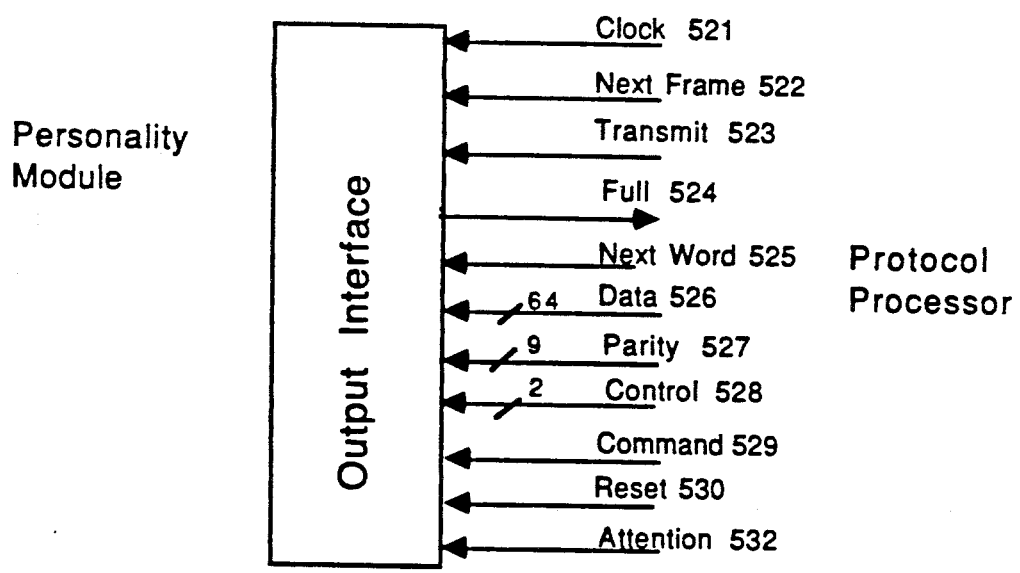
FIG. 5(b) is a diagram illustrating an output interface of the present invention.

Output Interface from the Protocol Processor—FIG. 5(b)

An output interface, shown as FIFO buffer 405 of FIG. 4, provides an interface to the personality module 404, allowing the host computer 301 to receive data from the backplane bus 311. The output interface is described in more detail with reference to FIG. 5(b) and Table III.

TABLE III

| Signal Name | Undriven State | Direction | Meaning |
| --- | --- | --- | --- |
| Out_clock | | PP to PM | Continuously running period ≧ 50 ns |
| Next_frame | false | PP to PM | Accept frame marker; advance FIFO |
| Transmit | false | PP to PM | Enable assertion of Word_ready signal |
| Full | false | PM to PP | FIFO is (nearly) full |
| Next_word | false | PP to PM | Accept data; advance FIFO |
| Data | 1 | PM to PP | 64-bit data word |
| Parity | 1 | PM to PP | 9 odd parity bits on data and control bits. |
| Control | 1 | PM to PP | Control signals |
| Command | false | PP to PM | Command, not data, being presented |
| Reset | true | PP to PM | System reset |
| Attention | false | PM to PP | Serious error detected by the PM |

The clock signal 521 is provided by the protocol processor to the personality module to control synchronization for control signal. The personality module samples control signals on the rising edge of the clock signal 521. The next frame signal 522, when asserted by the protocol processor, causes an end-of-frame marker to be placed in the buffer and a new buffer to be selected on the rising edge of the clock signal 521.

The transmit signal 523, when asserted, causes the transmission of the current frame from the protocol processor to the personality module on the rising edge of the next clock.

The full signal 524 indicates the personality module is able to accept a predetermined additional number of 64-bit words for loading into the current buffer. Full signal 524 is asserted after the next word signal 525 which causes the buffer to have room for only a predetermined number of words and is deasserted by the personality module when there is room for more than the predetermined number of words. In the preferred embodiment, the predetermined number varies depending upon the particular personality module, however, it is always at least four.

The next word signal 525 causes the data word, parity bits and control bits currently on data lines 526, parity lines 527 and control lines 528 to be written, on the rising edge of the next clock signal 521, to the location pointed to by the pointers in the current buffer. The pointers are then advanced to the next location in the buffer. As described above, the next word signal 525 also causes the full signal 524 to be asserted or deasserted by the personality module. If the next word signal 525 is asserted continuously, a new word will be written to the buffer and the buffer pointers advanced on the rising edge of each clock signal 521.

Before asserting the next word signal 525, the protocol processor drives appropriate data onto data lines 526, parity information onto parity lines 527 and control information onto control lines 528. Odd parity is used for the output data interface.

If the command signal line 529 is asserted, the personality module is to interpret the signals on data lines 526 as a command from the protocol processor. The next word signal 525 operates to unload commands and during the time this signal is asserted, all next word assertions are ignored for purposes of writing to buffers and changing buffer pointers. The full signal 524 is asserted by the personality module to indicate it is capable of accepting the next command. Commands are dependent on the particular personality module type.

The reset signal 530 causes the personality module to be reset at the rising edge of the next clock signal 521.

The attention signal 532 has the function described in connection with the input interface.

Command Word—FIG. 6(b)

Command words of the preferred embodiment have the format shown with reference to FIG. 6(b). Bits 62-63 601 are used to address a particular personality module. A protocol processor of the preferred embodiment may address up to three personality modules, addressed as personality modules 0 through 3.

The unit field 602 (bits 58-61) are used to address a sub-unit within a particular personality module. Sub-units correspond to bi-directional links such as the links for coupling workstations 122 of FIG. 1 to a hub.

Field 603 (bits 54-57) are reserved in the preferred embodiment for future expansion of the functionality of the system.

Clear input unit select (CIUS) field 604 (bit 53) is used to cause all sub-units to clear their input data select latches.

Field 605 (bits 51-52) are reserved in the preferred embodiment for future expansion of the functionality of the system.

Command invalid (CI) field 606 causes the command word select and command bits to be ignored by the personality module if the CI bit is a 1. If the CI bit is a 0, the Command Word Select and Command bits are valid.

Latch input unit select (LIUS) field 608 (bit 49) is used to cause all sub-units to clock their input data select signals. The sub-unit addressed by the PM 601 and unit 602 fields sets its input data select latches to true and the remaining sub-units set their input data select latches to false. The latch output unit select (LOUS) field 609 (bit 48) is used to cause all sub-units to clock their output data select signals. Again, the sub-unit addressed by the PM 601 and unit 602 fields sets its output data select latches to true and the remaining sub-units set their output data select latches to false.

The status select word (STATSEL) field 610 (bit s 40–47) is an eight bit field specifying which status word is to be made available by the addressed sub-unit for reading by the protocol processor. The command word select (CMD SEL) field 611 (bits 32–39) is an eight bit field which specifies which of the addressed sub-units command registers are to be operated on by the command (COMMAND) word 612 (bits 0–31).

PROTOCOL PROCESSOR

Referring again to FIG. 4, a protocol processor 403 of the present invention is described in more detail. The protocol processor comprises a data, acknowledgement, command processor (DACP), a control processor (CP) 411, transfer controllers, 412 and 413, FIFO buffer, 415 and 416, and bus interface 410. Generally, the protocol processor 403 provides the functions of a high-speed message switch for switching information passing between the host computer 401 and the backplane bus 420. In addition to controlling the communication of messages, the protocol processor 403 provides for translation of messages.

For purposes of translation, messages can be thought generally as falling into one of two categories: (1) time-critical and (2) non-time-critical. Time-critical messages generally comprise data, acknowledgement messages and data transfer requests. Non-time-critical messages generally are messages other than acknowledgements and data messages, such as messages for network control and establishment of communication links.

As discussed above, the protocol processor of the present invention logically may be thought of as comprising two types of processors: (1) a data, acknowledgement, command processor (DACP) and (2) a control processor (CP). Time-critical messages are processed by the DACP and non-time-critical messages are processed by the CP. The DACP examines every packet which arrives from the personality modules and selects those host requests and network messages which it can process. Other messages (non-time-critical messages) are forwarded to the CP. The CP then processes such messages.

In practice, the CP generally sets up connections on the network and the DACP manages data and acknowledgement traffic. The DACP and CP share access to connection state information allowing the CP to manage the progress of each connection and change parameters for optimization.

This architecture allows the DACP to parse headers of packets as they are received. As one aspect of the present invention, the use of FIFO buffers allows packet information to be concurrently received by the protocol processor while the DACP is processing the header information. The DACP begins processing header information as soon as actual data is received. Based on the processed header information, the DACP determines how the packet is to be handled. The DACP then directs forwarding of the packet's data onto the backplane bus.

The above-described system eliminates the majority of the buffer management routines necessary in prior art networking systems by allowing an incoming message to be forwarded to the output port even before it is entirely received.

In one embodiment of the present invention, the DACP comprises a Advanced Micro Devices 29331/29332 bipolar processor and 8K 32-bit words of control store memory.

The CP comprises an Intel 80386 microprocessor, an Intel 82580 DMA controller/timer/interrupt handler, an AT&T Starlan TM connection, 1 megabyte of random access memory (RAM) and a read only memory (ROM). The particular embodiment utilizes an electrically erasable programmable read only memory (EEPROM) for its ROM.

This particular embodiment of the present invention utilizes a common memory 418 comprising 128 slots of 128 32-bit words accessible from both the DACP and the CP. The common memory is used for shared data structures and for communication between the two processors. Each processor (DACP and CP) has a private pointer which selects which slot is currently available. A hardware mechanism is provided which advises the processors when both are selecting the same slot. The mechanism does not prevent access to the slot, but rather just advises of potential conflict. It will be obvious to one of ordinary skill in the art that alternate processors could be utilized without departure from the spirit and scope of the present invention. Further, in a second embodiment, a single physical processor is used to logically perform the functions of the DACP and CP. In the particular embodiment, an Intel 80386 is utilized. This embodiment will be discussed in more detail below.

The DACP/CP model of the present invention allows for "flow-through" of packets. That is, the DACP may begin translation or parsing of a message packet as soon as data is available in the FIFO buffer. After the DACP has parsed enough header information in the message packet to determine the message type and forwarding information, the DACP formats a new header and begins forwarding the information. Information may then be routed, either to the CP for further processing or out from the protocol processor to the backplane bus or personality module. For example, the header may indicate the message packet is a normal transport header and the message should be routed to another network adapter. Alternatively, the header may indicate the message is a DMA word which is communicated directly to the host personality module's memory. This flow-through approach eliminates the majority of the buffer management routines required in the prior art and improves on buffer utilization by operating on message packets before they are entirely received.

The backplane bus of the presently preferred embodiment comprises a 64-bit wide bidirectional, active high, tri-state bus. 64-bit words are strobed on the backplane bus at 40–60 nanoseconds. A parity bit is generated for each byte on the data bus. Odd parity is generated for the each of the eight 8-bit bytes and is presented on the bus active high. Parity bits are used when transferring data between two adapters on the same bus (i.e. adapters coupled with the same hub).

For each data frame, a longitudinal checksum is calculated which insures data has been transmitted correctly and no words have been added or deleted. The calculation of this checksum will be discussed in more detail below. Importantly, the checksum bytes are appended to the end of data packets allowing for the flow-through model of the present invention.

The Processing Model

Figure 7A:
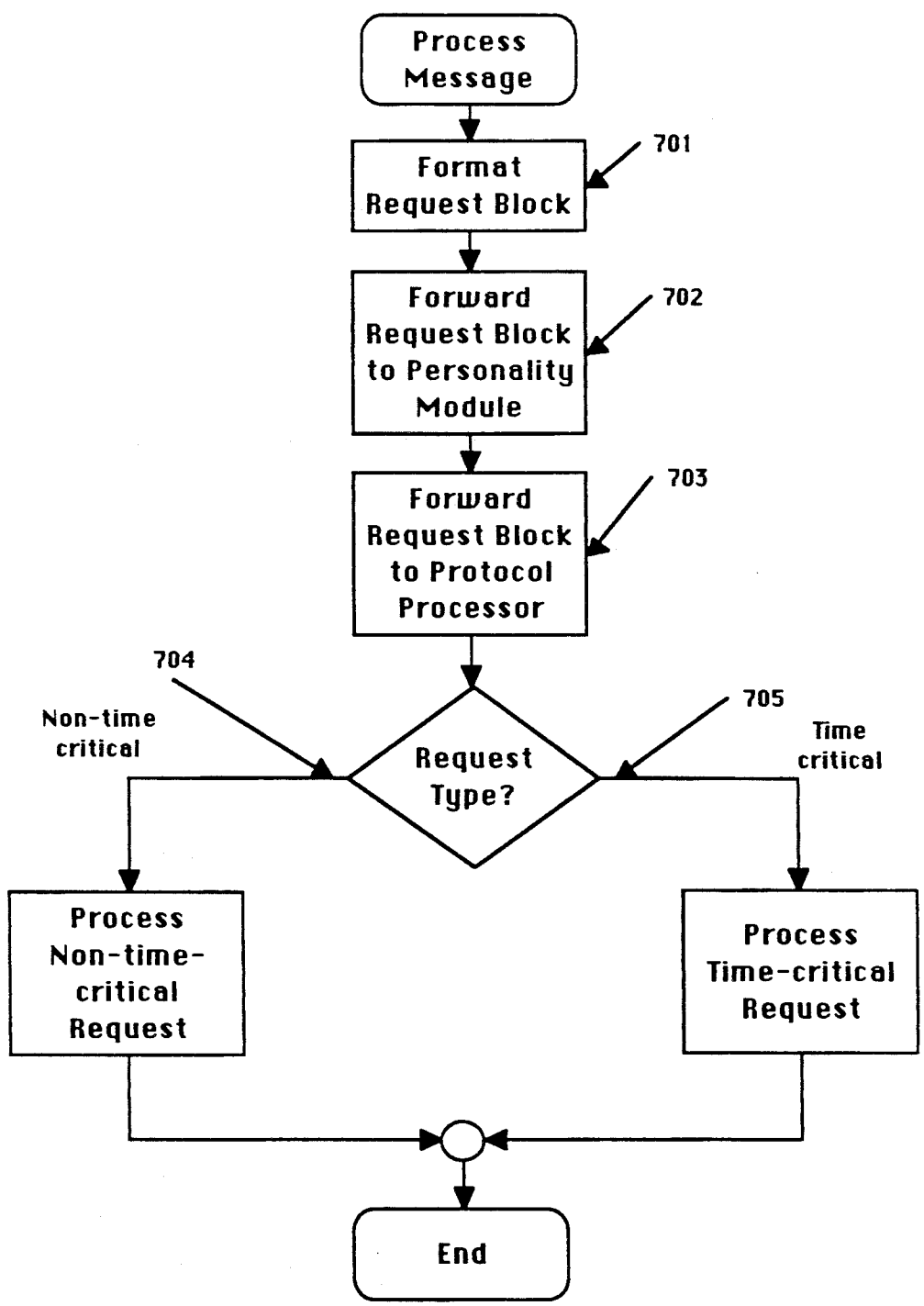
FIG. 7(a) is a flow diagram illustrating message processing in the present invention.

Processing of messages in the present invention is described in more detail with reference to the flow diagrams of FIGS. 7(a), 7(b) and 7(c). Referring first to FIG. 7(a), a host user process which wishes to establish a connection with a process on another host formats a request block, block 701. Typically, the request block is formatted by a device driver process on the host computer. The request block contains a connection request command and a data field containing the destination host and process address.

The request block is forwarded to the personality module to which the host device is connected, block 702, and the personality module forwards the request block to the protocol processor, block 703. The DACP begins parsing the request block as soon as data is received into its FIFO buffer and determines the request type. Initially, the DACP determines the request is a connection request (non-time-critical request), branch 704.

Figure 7B:
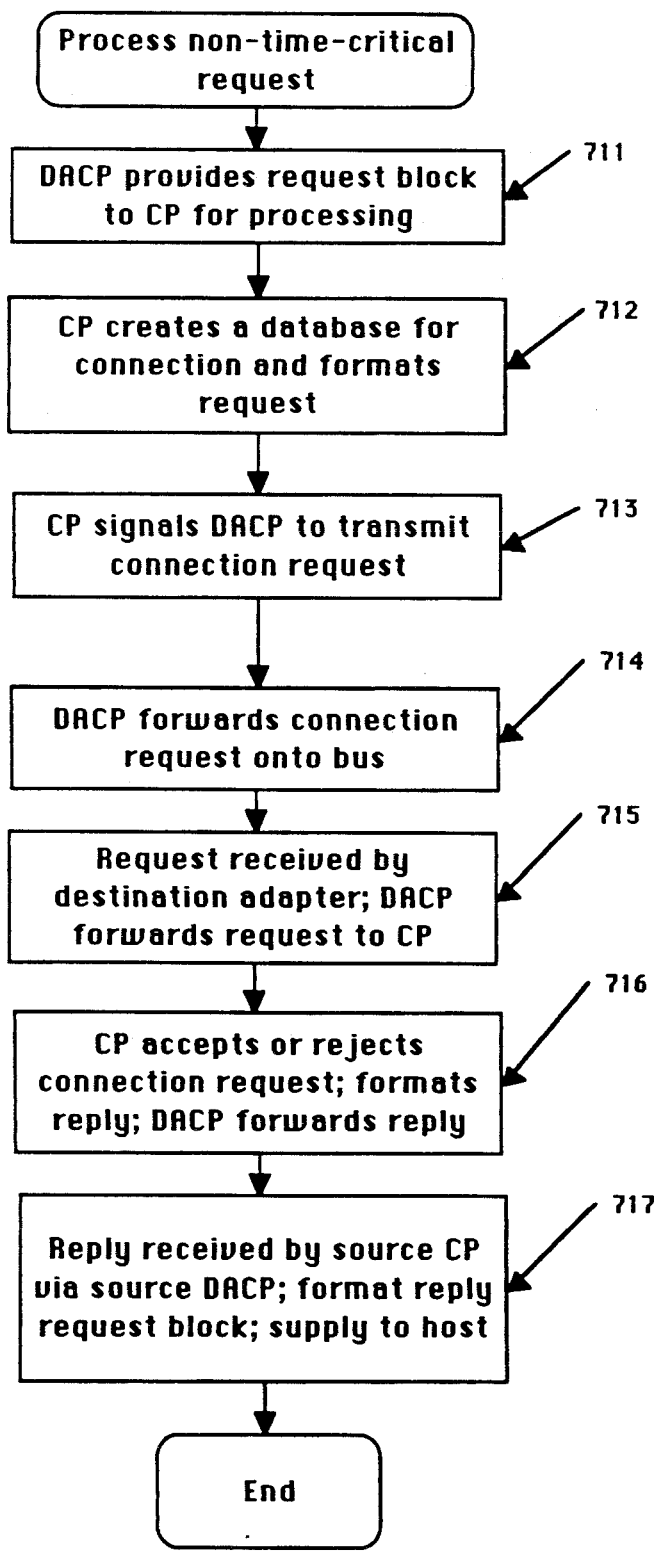
FIG. 7(b) is a flow diagram illustrating processing of non-time-critical messages in the present invention.
Figure 7C:
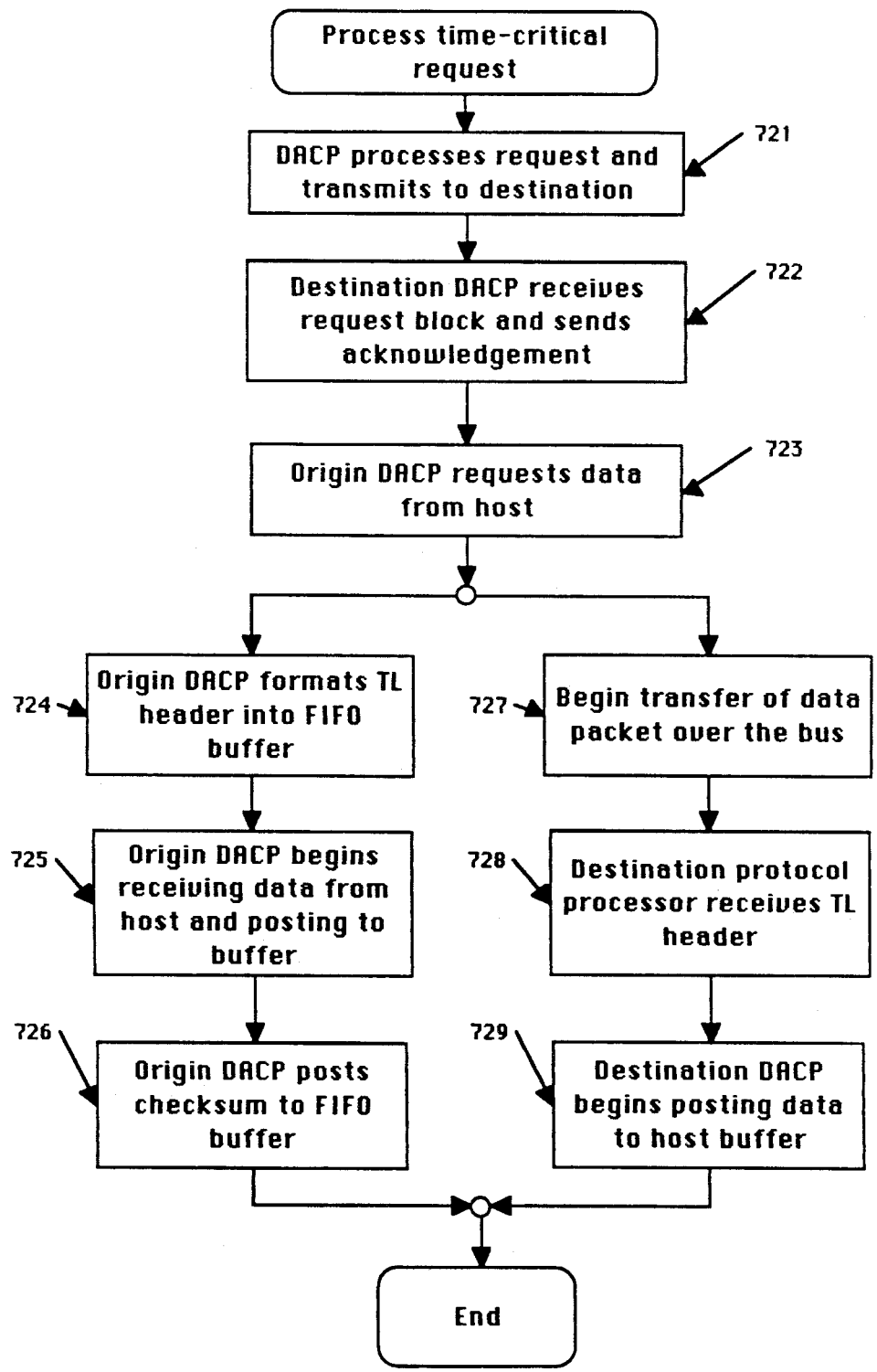
FIG. 7(c) is a flow diagram illustrating processing of time-critical messages in the present invention.

Referring to FIG. 7(b), the DACP provides the connection request to the CP for processing, block 711, and the CP sets up a database for the request in memory 418 of FIG. 4. The database comprises connection state and optimization information. The CP then formats a connection request Transport Protocol Data Unit (TPDU), block 712. The CP then signals the DACP to transmit the request onto the backplane bus, block 713.

The request is received over the backplane bus by the destination adapter module and the request is processed, as it arrives in the FIFO buffer of the destination adapter, by the destination DACP. The DACP determines the request is not for an existing connection and provides the request to the destination CP for processing, block 715.

The destination CP processes the request and determines whether the connection request is accepted or rejected; the destination CP then formats a reply and provides the reply to the destination DACP for forwarding to the source adapter. The destination DACP provides the reply onto the backplane bus, block 716.

The reply is then received by the source CP via the source DACP. The source CP formats a reply request block and supplies the reply request block to the host processor, again via the source DACP, block 717.

To transmit data, a user process notifies the device driver it wishes to transmit information and supplies connection reference information which was given to it in the reply request block. The user process further supplies address information and the length of the data it wishes to transmit. The device driver again formats a request block, block 701, and forwards the request block to the personality module, block 702. The personality module then forwards the request block to the protocol processor, block 703, and the DACP determines the request type. The DACP determines the request is for a time-critical request, branch 705 (i.e., transport of data).

The DACP then begins transmitting the information to the destination adapter, block 721. The destination DACP receives the information provided by the origin host computer and provides the destination host with the information. The destination host sets up appropriate buffers for receipt of the data. The DACP then formats and sends an acknowledgement message to the origin protocol processor, block 722. Responsive to receiving the acknowledgement, the origin DACP begins formatting direct memory access (DMA) requests to the origin host asking for n data units, block 723. The origin host then moves the data to the protocol processor preceded by a DMA word, block 725. The origin DACP obtains the data and recognizes as the data requested. The origin DACP then formats a transport layer (TL) network header in its output FIFO buffer and begins transferring data into the output FIFO. After completing transfer of data, a trailer is transmitted into the buffer containing a checksum, block 726.

At some point during this process, the information in the output FIFO buffer will begin to be transported onto the backplane bus and to the destination protocol processor, block 727. Simultaneously, the DACP continues to process data arriving from the host and placing such data into the FIFO.

On the destination protocol processor, the transport layer network header is received by the DACP and recognized as a time-critical request, block 728. The DACP determines the address of the host buffer and begins passing data to the host personality module preceded by an appropriate DMA word, block 729. Periodically, the DACP generates acknowledgements which indicate receipt of data.

In this manner, communication is established between the host and destination modules in the network.

CHECKSUM CALCULATION

The present invention discloses apparatus and methods for providing increased performance in calculation of checksums during the transfer of information in a computer network system. The present invention recognizes inherent problems in including the checksum as part of the packet header such as the requirement of two passes over the data packet, one to build the header and a second to calculate the checksum. Further, the present invention discloses methods of calculating checksums in parallel with arrival of bytes of a packet. Finally, the present invention discloses algorithms for increased speed in checksum calculation.

In the preferred embodiment calculation of checksums is provided by circuitry implemented as gate arrays in the protocol processor.

In the following description, all arithmetic is 8-bit one's complement (modulo 255) arithmetic. Further, in describing the checksum method of the present invention, certain symbols will be defined as follows:

| | |
|---|---|
| $i=$ | byte position a string of bytes to be checksummed, $i = 1..L$ |
| $n=$ | byte position of the first checksum byte |
| $a_i=$ | i-th byte of the string of bytes to be checksummed, $i = 1..L$ |
| $a_n=$ | first checksum byte |
| $a_n + 1=$ | second checksum byte |
| $L=$ | number of bytes in the string of bytes to be checksummed |
| $S_i(a_i)=$ | one's complement (modulo 255) sum of $a_i$ over the range of i. |

In general, to perform verification of a checksum, values C0 and C1 are computed such that:

$$C_0 = S_i(a_i), \text{ and};$$

$$C_1 = S_i(a_i * (L-i-1)),$$

for $i = 1 \ldots L$.

Then, if $C_0 = C_1 = 0$, the checksum passes. This calculation may be carried out as bytes of the packet arrive at the destination protocol processor.

In the present invention, two checksum bytes $a_n$ and $a_{n+1}$ are calculated and appended to the data packet as the last two bytes. The values of checksum bytes $a_n$ and $a_{n+1}$ are not considered to be part of the data packet for purposes of calculation of the checksum bytes. To allow the above checksum verification formula (i.e., $C_0 = C_1 = 0$) to calculate properly, it may be shown algebraically that:

$$(C_0 + a_n + a_{n+1}) \text{ must equal zero; and}$$

$$(C_1 + ((L-n+1)*a_n) + ((L-n)*a_{n+1})) \text{ must equal zero.}$$

Solving these equations for $a_n$ and $a_{n+1}$ yields:

$$a_n = -C_1 + (C_0*(L-n)); \text{ and}$$

$$a_{n+1} = C_1 - (C_0*(L-n+1))$$

Values for $C_0$ and $C_1$ may be computed as each byte of the data packet is received by initializing both $C_0$ and $C_1$ to zero and, then for each input byte $ai$, computing $C_0$ and $C_1$ as:

$$C_0 = C_0 + a_i; \text{ and}$$

$$C_1 = C_1 + C_0.$$

The preferred embodiment of the present invention calculates checksums using 64-bit registers. To extend the above calculations to allow use of 64-bit registers, the notation may be expanded as follows:

$C_{0j} = $ j-th byte of a 64-bit register $C_0$ where $C_{00}$ is the least significant byte and $C_{03}$ is the most significant byte;

$C_{1j} = $ j-th byte of a 64-bit register $C_1$; and $a_{ij} = $ j-th byte of i-th checksummed 32-bit word for $i = 1..L$ and $j = 0..3$.

After initializing $C_{0j}$ and $C_{1j}$ to zero before beginning processing of a data packet, for each input $a_{ij}$ values for $C_{0j}$ and $C_{1j}$ are computed as:

$$C_{17} = C_{17} + 8*C_{03} + 1*a_{i7};$$

$$C_{16} = C_{16} + 8*C_{03} + 2*a_{i6};$$

$$C_{15} = C_{15} + 8*C_{03} + 3*a_{i5};$$

$$C_{14} = C_{14} + 8*C_{03} + 4*a_{i4};$$

$$C_{13} = C_{13} + 8*C_{03} + 5*a_{i3};$$

$$C_{12} = C_{12} + 8*C_{02} + 6*a_{i2};$$

$$C_{11} = C_{11} + 8*C_{01} + 7*a_{i1};$$

$$C_{10} = C_{10} + 8*C_{00} + 8*a_{i0}; \text{ and}$$

$$C_{0j} = C_{0j} + a_{ij} \text{ for } j = 0..3.$$

VME BUS INTERFACE

The present invention is further implemented in a VME adapter version for allowing connection of host computers having a VME bus interface to connect to the network. The preferred embodiment of the present invention implements the VME adapter having a single physical processor in the protocol processor. Specifically, the VME adapter is implemented using an 80386 processor which handles the functions of both the DACP and CP.

Figure 8:
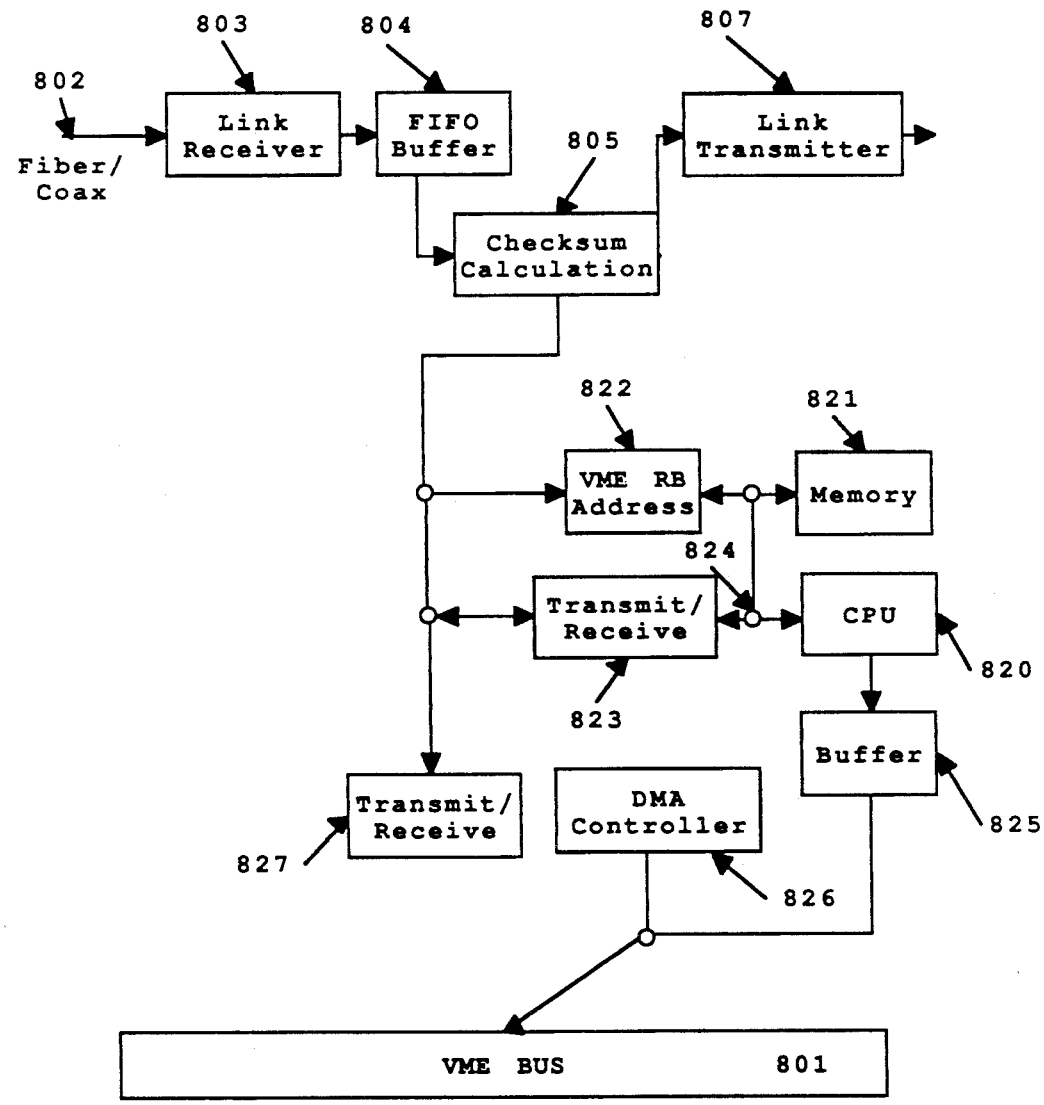
FIG. 8 is a block diagram illustrating a VME adapter card as may be utilized by the present invention.

The VME adapter is shown in block diagram form in FIG. 8. The VME adapter provides a direct data connection between a link adapter card coupled with the backplane bus of a hub and a VME bus.

Referring now to FIG. 8, the VME adapter provides for coupling a VME bus 801 to a network. Data input from the network is received, preferably on a fiber optics or coaxial cable 802, by a link receiver 803.

The link receiver is preferably coupled with a FIFO buffer 804 for allowing high-performance acceptance of data. The input FIFO buffer of the preferred embodiment comprises four discrete 32K × 8 RAMs (128K).

Checksums on data frames received from the network may be verified, as described above, by a checksum calculation means 805. Preferably, the checksum calculation means 805 is realized in a gate array.

Data packets to be output to the network have checksum bytes computed by checksum calculation means 805 and bytes of data are then provided to link transmitter 807.

Data packets are transferred to the VME bus under the control of a protocol processor. The protocol processor of the present invention comprises a CPU 820, memory 821, VME request block address circuitry 822 and transmit/receive circuitry 823 coupled together by bus 824. The CPU 820 is responsible for execution of network control software and advantageously does not operate on data received from the network or VME bus. The CPU 824 preferably comprises an Intel 80386 microprocessor and is responsible for coordinating all communication across the link and for setting up and monitoring operations to the VME host. The CPU provides error handling, network management and message routing services, logically providing the functions of both the CP and DACP of the above-described adapter cards.

The memory 821 preferably comprises a main memory, a fast memory, a EEPROM and an EPROM. The main memory is implemented with nine 256K × 4 DRAMs arranged in a 1 Mb array, including byte wide error checking. Executable code is received from the EPROM, VME bus or input FIFO ports and stored in the main memory. Routines for processing data frame headers and other time critical tasks (DACP tasks) are stored in a fast memory preferably implemented with four 8K × 8 SRAMs (32 Kbytes). Future embodiments of the fast memory will utilize four 64K × 8 SRAMs allowing for expansion of fast memory to 128 Kbytes. An EEPROM is utilized for storage of non-volatile data items such as network addresses, VME configuration modes and other parameter information. An EPROM is provided for storage of boot, diagnostic, debugger and other routines. A buffer 825 is coupled between the VME bus 801 and CPU 820. A DMA controller 826 is further provided for controlling access to the VME bus 801. Finally, transmit/receive circuitry is provided for coupling between the network link and VME bus 801 and for receiving VME data words.

PROTOCOL PROCESSOR FUNCTIONS

The protocol processor of the present invention has been described herein with respect to its function as a data transport engine. The protocol processor may function in a number of other modes. For example, the protocol processor of the present invention is useful as a frame buffer between a high speed computer and a display device or the protocol processor may function as a high speed channel. In each of these cases, the protocol processor of the present invention continues to utilize the inventive techniques allowing processing of information packets as the packets are received (and not requiring receipt of an entire packet prior to beginning of processing); the technique of separately processing time-critical and non-time-critical requests; and the technique of allowing calculation of checksums while receiving a data packet rather than requiring receipt of the entire packet prior to beginning checksum calculations.

Thus, an apparatus and method for networking computer systems is described. Although the present invention has been described with specific reference to a number of details of the preferred embodiment, it will be obvious that a number of modifications and variations may be employed without departure from the scope and spirit of the present invention. Accordingly, all such variations and modifications are included within the intended scope of the invention as defined by the following claims.

What is claimed is:

1. A network for allowing communication between a plurality of computing devices comprising:
   a central communication means for communicating information; and
   adapter means coupled with said central communication means, said adapter means further coupled to a first of said computing devices, said adapter means for allowing communication of information between said central communication means and said first of said computing devices, said adapter means comprising:
   (a) means for determining type of information communicated from said first of said computing devices, said means for determining type of information coupled to receive non-time-critical commands from said first of said computing devices;
   (b) means for processing said non-time-critical commands received from said first of said computing devices, said non-time-critical commands being directed to said means for processing non-time-critical commands by said means for determining type of information; and
   (c) means for transferring information to be communicated to a second of said computing devices, said information being directed to said means for transferring information by said means for determining type of information.

2. The network as recited by claim 1 wherein said adapter means further comprises a first buffer means for communicating information with said first of said computing devices, said first buffer means coupled with said first of said computing devices.

3. The network as recited by claim 2 wherein said adapter means further comprises a second buffer means for communicating information with said central communication means, said second buffer means coupled with said central communication means.

4. The network as recited by claim 2 wherein said first buffer means comprises a FIFO buffer.

5. The network as recited by claim 3 wherein said second buffer means comprises a FIFO buffer.

6. The network as recited by claim 1 wherein said adapter further comprises means for computing a checksum of information received by said adapter means.

7. The network as recited by claim 1 wherein said central communication means comprises a backplane bus.

8. The network as recited by claim 1 wherein said non-time-critical commands comprise network management commands.

9. An apparatus for communication of information in a computer network system comprising:
   a unit of information comprising a plurality of subsections of information which are transmitted in serial fashion from said computer network system;
   checksum value associated with said subsections of information for said unit of information, said checksum value transmitted, in serial fashion, trailing said unit of information;
   means for accepting said subsections of information from a first computing device and for accepting said checksum value;
   means for computing checksum information for said unit of information as each of said subsections of information arrive at said means for accepting said subsections of information; and
   means for comparing said computed checksum value, after said unit of information arrives, to said checksum value associated with said unit of information.

10. The apparatus as recited by claim 9 wherein said means for accepting units of information comprises a FIFO buffer.

11. The apparatus as recited by claim 10 wherein said means for computing checksum information comprises a gate array.

12. A networked computer system, said networked computer system comprising a first hub, a second hub and a first communication means, said first communications means coupling said first hub with said second hub for providing communication between said first and second hub, said networked computer system further comprising a first host device coupled with said first hub and a second host device coupled with said second hub, said first hub further comprising an adapter means for coupling said first host device with said first hub, said adapter means comprising:
   a first interface for coupling with said first host;
   a second interface for coupling with a second communication means, said second communication means for communicating information within said first hub;
   a message processing means for processing messages received from said first host, said message processing means having a first means for processing network control messages and a second means for processing data transfer messages.

13. The networked computer system as recited by claim 12 wherein said first interface further comprises a first FIFO buffer for allowing communication between said message processing means and said first host.

14. The networked computer system as recited by claim 13 wherein said second interface further comprises a second FIFO buffer for allowing communication between said message processing means and said second communication means.

15. The networked computer system of claim 12 further comprising a checksum computation means, said checksum computation means for examining bytes of information as said bytes are received from said first host and computing a checksum for a packet of data received from said first host.

16. The networked computer system as recited by claim 15 wherein said checksum computation means comprises a gate array.

17. The networked computer system as recited by claim 12 further comprising a third interface means for providing a standard interface between said adapter means and said first host.

18. The networked computer system as recited by claim 17 wherein said standard interface comprises:
   a clock signal means for providing clock signals from said adapter means to said third interface means;
   a next frame request signal means for providing a request by said adapter means for transmission of a next frame of data;
   a words ready signal means for providing an indication by said third interface that data words are ready for transmission to said adapter means;
   a frame ready signal means for indicating a frame of data is available for transmission to said adapter means;
   a frame complete signal means for indicating a final word of a data frame is being transmitted to said adapter means;
   a next word signal means for requesting a next word of data to be provided to said adapter means;
   a plurality of data signal means for providing data to said adapter means;
   a plurality of parity signal means for providing parity information to said adapter means;
   a plurality of control signal means for providing control information to said adapter means;
   a status signal means for requesting status information from said third interface means; and
   a reset signal means for requesting said third interface means begin a reset sequence.

19. The networked computer system as recited by claim 17 wherein said standard interface comprises:
   a clock signal means for providing clock signals from said adapter means to said third interface means;
   a next frame signal means for indicating an end of a data frame;
   a transmit signal means for requesting transmission of information;
   a full indication signal means for indicating buffers in said third interface means are becoming full;
   a next word signal means for causing transmission of a next data word from said adapter means to said third interface means;
   a plurality of data signal means for providing data to said third interface means;
   a plurality of parity signal means for providing parity information to said third interface means;
   a plurality of control signal means for providing control information to said third interface means;
   a command signal means for indicating transmission of command information;
   a reset signal means for causing said third interface means to begin a reset sequence.

20. A method for communicating information in a networked computer system, said computer system comprising a plurality of host devices coupled to a network system, said method comprising the steps of:
   (a) said network system receiving a request from a first of said host devices;
   (b) said network system analyzing said request to determine a request type;
   (c) if said request is a network management request, said network system processing said network management request;
   (d) if said request is an information transfer request, said network system allowing information to flow-through said network system.

21. The method as recited by claim 20 further comprising the step of generating checksum information for said request.

22. The method as recited by claim 21 wherein said checksum information is calculated as each byte of information is received by said network system.

23. The method as recited by claim 20 further comprising the step of appending checksum information to said request as said request is allowed to flow through said network system.

24. A method for calculating a checksum for a packet of data in a computer system, said packet of data comprising a plurality of units of information, said method comprising the steps of:
   (a) receiving a first of said units of information;
   (b) calculating checksum information on said first unit of information;
   (c) repeating steps (a) and (b) for each remaining unit of information in said packet of data.

25. The method as recited by claim 24 further comprising the step of appending checksum information as the last units of information in said data packet.

26. A method for processing message packets in a computer system, said message packets comprising a plurality of units of information, comprising the steps of:
   receiving header information of said message packet, said header information comprising at least one unit of information;
   determining a message type of said message packet as said units of information are received;
   forwarding said message packet simultaneous with the arrival of said units of information.

27. The method as recited by claim 26 further comprising the step of calculating checksum information for said message packet as said units of information are received.

28. The method as recited by claim 26 further comprising the step of appending checksum information to said message packet as said message packet is forwarded.

29. An apparatus for communication of information in a computer network system comprising:
   a transmission means for transmitting data;
   a data frame of information comprising individual packets of information such that a plurality of said packets of information processed in a serial manner are within said data frame of information, said data frame transmitted by and from said transmission means;
   a sending checksum value associated with said data frame of information, said sending checksum value transmitted with said data frame of information by said transmission means;
   receiving means for accepting said data frame of information from said transmission means, said receiving means accepting each of said individual packets of information as said individual packets of information arrive;

computing means for computing an intermediate receiving checksum value for said individual packets of information as each of said individual packets of information arrive at said receiving means, said intermediate receiving checksum value becoming a final receiving checksum value upon the last of said each of said individual packets of information arriving;

comparing means for making a comparison of said final receiving checksum value to said sending checksum value, said comparing means for generating a indicator signal indicating the result of said comparison.

30. The apparatus as described in claim 29 wherein said receiving means comprises a FIFO buffer.

31. The apparatus as described in claim 30 wherein said computing means comprises a gate array.

32. A network for allowing communication between a plurality of computing devices comprising:

a central bus means for communicating information, said central bus means comprising a plurality of receiving stations for accepting connection to other communication means; and one or more adapter means coupled with said central bus means at one of said receiving stations, each of said adapter means further coupled to at least a first of said computing devices, said adapter means for allowing communication of information between said central bus means and said first computing device, each of said adapter means; comprising:

(a) determining means for determining type of information communicated from said first computing device coupled with said adapter means, said determining means for receiving time-critical commands and non-time-critical commands from said first computing device;

(b) first processing means for processing said time-critical commands received from said first computing device, said time-critical commands being directed to said first processing means by said determining means;

(c) second processing means for processing said non-time-critical commands received from said first computing device, said non-time-critical commands being directed to said second processing means by said determining means; and (d) first transferring means for transferring information to be communicated to a second of said computing devices, said information being directed to said transferring means by said determining means.

33. The network as recited in claim 32 wherein said adapter means further comprises a first buffer means for communicating information with said first computing device, said first buffer means coupled with said first computing device; and a second buffer means for communicating information with said central bus means, said second buffer means coupled with said central bus means.

34. The network as recited in claim 33 wherein said first buffer means comprises a FIFO buffer.

35. The network as recited in claim 33 wherein said second buffer means comprises a FIFO buffer.

36. The network as recited in claim 32 wherein said adapter further comprises computing means for computing a checksum of information received by said adapter means.

37. The network as recited in claim 32 wherein said non-time-critical commands comprise network management commands.

38. The network as recited in claim 32 wherein said first processing means further comprises flow-through processing means for transferring said time-critical commands between said first and said second computing devices.

39. The network as recited in claim 32 wherein said second processing means further comprises network processing means for processing said non-time-critical commands within the network apparatus.

40. The network as recited in claim 33 wherein said first processing means for time-critical commands comprises an Advanced Micro Devices bipolar processor and 8k 32-bits words of control store memory.

41. The network as recited in claim 33 wherein said second processing means for non-time-critical commands comprises an Intel microprocessor; an Intel DMA controller/timer/interrupt handler; an AT&T Starlan TM connection; and one megabyte of random access memory (RAM) and read only memory (RAM).

42. A method for communicating information in a networked computer and peripheral system, said method for communicating information comprising the steps of:

providing a central bus means for communicating information, said central bus means comprising a plurality of receiving stations for accepting connection to other communication means;

providing one or more adapter means coupled with said central bus means at one of said receiving stations, each of said adapter means further coupled to at least a first of said computing devices, said adapter means for allowing communication of information between said central bus means and said first computing device;

determining the type of information communicated from said first computing device to said adapter means and receiving time-critical commands and non-time-critical commands from said first computing device;

first processing said time-critical commands received from said first computing device, said time-critical commands being directed to said first processing step by said determining the type of information step;

second processing said non-time-critical commands received from said first computing device, said non-time-critical commands being directed to said second processing step by said determining the type of information step; and transferring information to be communicated to a second of said computing devices, said information being directed to said transferring means by said determining step.

43. The method as recited in claim 42 wherein further comprising the step of computing a checksum of information received by said adapter means.

44. The method as recited in claim 42 wherein said non-time-critical commands comprise network management commands.

45. The method as recited in claim 44 wherein said time-critical commands comprise data frames of and from said computing devices.

* * * * *